United States Patent [19]

Sianesi et al.

[11] 4,451,646

[45] May 29, 1984

[54] HIGH MOLECULAR WEIGHT POLYMERIC PERFLUORINATED COPOLYETHERS AND PROCESS FOR THEIR PREPARATION FROM TETRAFLUOROETHYLENE

[75] Inventors: Dario Sianesi; Adolfo Pasetti; Giorgio Belardinelli, all of Milan, Italy

[73] Assignee: Montedison, S.p.A., Milan, Italy

[21] Appl. No.: 42,863

[22] Filed: May 29, 1979

Related U.S. Application Data

[63] Continuation of Ser. No. 786,477, Apr. 11, 1977, abandoned, which is a continuation-in-part of Ser. No. 277,412, Aug. 2, 1972, abandoned, which is a continuation-in-part of Ser. No. 702,533, Feb. 2, 1968, Pat. No. 3,715,378.

[30] Foreign Application Priority Data

Feb. 9, 1967 [IT] Italy .............................. 12460 A/67
Aug. 5, 1971 [IT] Italy .............................. 27198 A/71

[51] Int. Cl.$^3$ ..................... C08G 63/76; C08G 67/00
[52] U.S. Cl. ..................................... 528/401; 252/54; 528/397
[58] Field of Search ........................... 528/397, 401

[56] References Cited

U.S. PATENT DOCUMENTS

| | | | |
|---|---|---|---|
| 2,971,949 | 2/1961 | Anderson | 526/11.1 |
| 3,442,942 | 5/1969 | Sianesi | 204/158 R |
| 3,650,928 | 3/1972 | Sianesi | 204/159.22 |
| 3,665,041 | 5/1972 | Sianesi | 252/54 |
| 3,715,378 | 2/1973 | Sianesi | 260/32.6 R |
| 3,810,874 | 5/1974 | Mitsch | 544/214 |
| 3,847,978 | 11/1974 | Sianesi et al. | 260/32.2 |

FOREIGN PATENT DOCUMENTS

1217871 12/1970 United Kingdom ............... 528/401

*Primary Examiner*—C. A. Henderson
*Attorney, Agent, or Firm*—Hubbell, Cohen, Stiefel & Gross

[57] ABSTRACT

Amorphous, highly viscous high molecular weight copolyethers containing in excess of 200 total repeating units and formed of $-CF_2-CF_2-O-$ and $-CF_2-O-$ repeating units randomly distributed along the chain and linked to each other either directly or through an oxygen atom, in which latter case a peroxy group is present along the chain. These copolyethers, which are useful for preparing bifunctional telomers, high molecular weight fluoropolymers, and highly stable lubricants and heat exchange materials, are prepared by reacting molecular oxygen with tetrafluoroethylene dissolved in a fluorinated or chlorofluorinated solvent selected from the group consisting of dichlorodifluoromethane, perfluorocyclobutane, perfluorodimethylcyclobutane, 1,2-dichloro-hexafluoropropane and 1,2-dichloro-tetrafluoroethane in the presence of ultraviolet radiation and under such conditions that the molar ratio of the tetrafluoroethylene to the oxygen in the reactant feed is between about 0.1 and 2, the reaction temperature is between about $-80°$ C. and $-35°$ C., the total pressure at the point where the gaseous reactants are introduced into the reaction zone is between about 1 and 2 atmospheres, and the ratio F/VE is greater than $3.0 \times 10^{-4}$ (mols./cc. watt hour) where F is the number of mols/hour of tetrafluoroethylene fed to the reaction zone, E is the number of watts of ultraviolet rays having a wave length below 3,300 Å which penetrate the reaction zone, and V is the volume of the reaction zone.

3 Claims, No Drawings

HIGH MOLECULAR WEIGHT POLYMERIC PERFLUORINATED COPOLYETHERS AND PROCESS FOR THEIR PREPARATION FROM TETRAFLUOROETHYLENE

Cross-Reference to Related Applications

This is a continuation of application Ser. No. 786,477 filed Apr. 11, 1977, now abandoned, which is in turn a continuation-in-part of application Ser. No. 277,412, filed Aug. 2, 1972 (now abandoned), which is a continuation-in-part of application Ser. No. 702,533, filed Feb. 2, 1968, now U.S. Pat. No. 3,715,378.

BACKGROUND OF THE INVENTION

1. Field of the Invention

The present invention relates to new polymeric products whose macromolecules essentially consist of carbon, fluorine and oxygen atoms, having a polyether structure, a high viscosity and a high molecular weight. Said polymers consist of —$CF_2$—$CF_2$—O— and —$CF_2$—O— repeating units, in a ratio between about 0.2 and 25, linked to each other either directly or through an oxygen atom, in which latter case a peroxide linkage is formed along the chain. The average value of the sum of all the repeating units is greater than 200. The ratio of the peroxide bridges to the sum of the perfluorooxyalkylene repeating units ranges from zero to 0.5.

The present invention is also concerned with a process for preparing these polymeric products, this process comprising photooxidizing of tetrafluoroethylene with molecular oxygen under particular reaction conditions.

2. Description of the Prior Art

In British Pat. No. 1,217,871, issued on May 4, 1971, as well as in U.S. patent application Ser. No. 702,533, the contents of which are incorporated herein by reference, there are described perfluorinated copolyether products whose macromolecules consist of the same repeating units as are present in the products of the present invention, i.e. —$CF_2$—$CF_2$—O— and —$CF_2$—O—, wherein the monomeric units are linked to each other either directly or through an oxygen atom, as well as a method for preparing these products. These copolyether products are also obtained from the photochemical combination of tetrafluoroethylene with molecular oxygen, but the polymerization degree reaches at most, 200 units. These products are prepared by a photochemical reaction of molecular oxygen with a liquid phase consisting of a tetrafluoroethylene solution in an inert solvent. The reaction is conducted in the presence of ultraviolet rays having wave lengths below 3,300 Å. Under the conditions employed in obtaining these prior copolyethers it was not possible to obtain products of the same type, i.e. having the same repeating units, but containing an average total number of repeating units in excess of 200.

SUMMARY OF THE INVENTION

We have now surprisingly found that, when operating under particular selected reaction conditions, it is possible to obtain polymeric products having considerably higher molecular weights than those of the products previously obtained. More particularly, the polymeric products of the present invention are prepared by using a photochemical process which, although it utilizes some of the parameters described in British patent No. 1,217,871 (and U.S. patent application Ser. No. 702,533), employs tetrafluoroethylene feeding conditions, particular fluorinated or chlorofluorinated solvents exhibiting negligible chain transfer phenomena, reactor volumes and radiation energy quantities whwereby the ratio of $C_2F_4$ flow (F) to the product of reactor volume (V) and radiation quantity (E) is higher than a given minimum value.

Indeed, it has been found that in order to obtain the high molecular weight polyether products of the present invention it is necessary for the above ratio $F/(V \times E)$ to be in excess of $3 \times 10^{-4}$, generally between about 3 and $50 \times 10^{-4}$. Preferably, this ratio is between 3.1 and $10 \times 10^{-4}$. In this ratio, F represents mols/hour of tetrafluoroethylene fed, E is the quantity, in watts, of U. V. rays having a wave length lower than 3,300 Å which penetrate into the radiation reaction zone, and V is the reactor volume expressed in cc.

The process of this invention, more particularly, consists of reacting molecular oxygen with tetrafluoroethylene dissolved in a fluorinated or chlorofluorinated solvent selected from the group consisting of dichlorodifluoromethane, perfluorocyclobutane, perfluorodimethylcyclobutane, 1,2-dichloro-tetrafluoroethane and 1,2-dichloro-hexafluoropropane under the following conditions: a tetrafluoroethylene/oxygen ratio in the reactant feed between about 0.1 and 2, preferably about 0.5 (feeding is generally carried out by bubbling a gaseous mixture into the solvent in the reaction zone); a reaction temperature between about $-80°$ C. and $-35°$ C.; a total pressure, measured at the inlet of the gaseous reactants into the reaction zone, between 1 and 2 atmospheres; feeding the tetrafluoroethylene in such a quantity (into the reaction zone) as to cause the ratio F/VE to be higher than $3 \times 10^{-4}$ and preferably between $3.1 \times 10^{-4}$ and $10 \times 10^{-4}$ (mols/cc watt hour) wherein F is mols/hour of tetrafluoroethylene fed, E is the quantity, in watts, of U. V. rays having a wave length of less than 3,300 Å penetrating the reaction system, and V is the reactor volume in cc.

The product of the present invention, produced by the foregoing process, is an amorphous, highly viscous high molecular weight perfluorinated polymeric copolyether; the macromolecules of which have a chain structure consisting essentially of —$CF_2$—$CF_2$—O— and —$CF_2$—O— repeating units, said repeating units being randomly distributed along the chain and linked one to another either directly or through an oxygen atom, in which latter case a peroxy group is present along the chain, the ratio of the total —$CF_2$—$CF_2$—O— units to the total —$CF_2$—O— units being between about 0.2 and 25, the peroxidic oxygen content being up to 10 parts by weight per 100 parts of the copolyether, and the average sum of all the repeating units present along the chain being from in excess of 200 to about 1000. Practically, the repeating units randomly distributed along the chain are linked one to another directly except for those units that are linked one to another through an oxygen atom, whereby peroxy groups are formed along the chain.

DESCRIPTION OF THE PREFERRED EMBODIMENTS

As already indicated, it is preferred that in carrying out the process of this invention the ratio $F/(V \times E)$ be between about $3.1 \times 10^{-4}$ and $10 \times 10^{-4}$.

In one preferred embodiment, after the irradiation induced reaction of tetrafluoroethylene with oxygen has been completed, the reaction product is then heated to a temperature of about 250° C. and then subjected to a fluorination treatment with pure fluorine or fluorine diluted with an inert gas selected from the group consisting of nitrogen, helium and argon, at a temperature between about 100° C. and 350° C. at a pressure between about 0.2 and 10 atomspheres, using the procedure described in U.S. Pat. No. 3,665,041.

In one preferred embodiment of the copolyether of the present invention, the ratio of the total $-CF_2-CF_2-O-$ units to the total $-CF_2-O$ repeating units is between 1 and 20, the peroxidic oxygen content is below 6 parts by weight per 100 parts of the copolyether and the intrinsic viscosity at 30° C. is from in excess of 0.14 dl/g to about 0.50 dl/g. In another preferred embodiment, the copolyether of the present invention contains no peroxidic oxygen.

It was surprising to find that, within the foregoing temperature and pressure conditions and the above mentioned ratio of tetrafluoroethylene to oxygen, the high molecular weight copolyethers of the present invention could only be obtained by employing the particular values of $F/(V \times E)$ and the particular solvents herein set forth. Indeed, the reaction is a photochemical reaction wherein, depending upon the geometry of the reaction, the absorption of light and the intensity of irradiation at different points of the reaction mixture are regulated by complicated laws. In particular, along a ray of light perpendicular to the axis of the lamp, there is superimposed the effect of dilution of ultraviolet light the purely geometrical reasons (divergence of light rays) with the effect of an exponential reduction in ultraviolet light intensity due to the absorption of the photons by the reacting system (cf. e.g. S. M. Jakob and J. S. Dranoff, AIChEJ* (1970), 16, 3, page 359-363, entitled "Light intensity profiles in a perfectly mixed photoreactor"). Since, moreover, the molecular weight of the products which are formed in a process of this kind depends in turn on light intensity, as well as on complicated laws which take into account the generality of the reactions leading to the formation of the polymeric macromolecule (and, in particular, since these are chain reactions, the ratios between the propagation rates of the chain and those of the chain terminals), it is difficult to theoretically foresee how to adjust the various parameters to obtain copolyethers with higher molecular weights than those of the copolethers described and claimed in British Pat. No. 1,217,871, and U.S. patent application Ser. No. 702,533, now U.S. Pat. No. 3,715,378.

(*) American Institute of Chemical Engineers Journal

The advantages of the products of the present invention over the lower molecular weight products of British Pat. No. 1,217,871 and U.S. Pat. No. 3,175,378 are relevant to the particular fields of use of these products.

One of these fields, e.g., is the use of the crude perfluorocopolyether polyperoxides of the invention, after suitable treatments, as intermediates for the preparation of bifunctional perfluorinated telomers. The latter are obtained by photochemically or thermally reducing the ratio of peroxide bridges to ether bridges to an adequate selected value and then splitting the chain with the aid of suitable reducing agents at each of the residual peroxide bridges.

Reducing agents suitable for splitting the above polyether chains are those described in Italian Pat. No. 817,809 issued on July 1, 1968, and U.S. patent application Ser. No. 834,486, filed June 18, 1969, now U.S. Pat. No. 3,847,978; in particular, they include molecular hydrogen; nascent hydrogen; primary and secondary alcohols either alone or in the presence of an aluminum alcoholate; simple hydrides; boron and aluminum complex hydrides; sulfur dioxide, hydrogen sulfide and their alkali metal salts, e.g., sodium sulfide, potassium sulfide and sodium and potassium sulfohydrates; hydrazine; hydroxylamine; phosphorous acid, hypophosphorous acid and their alkali metal salts; iron; tin; stannous chloride; hydrogen iodide; and a complex reducing agent consisting of a mixture of 57% aqueous hydroiodic acid with iron or gaseous $SO_2$.

Since the polyether polyperoxide chains obtained from the photooxidation of tetrafluoroethylene generally have both acid and neutral terminals, the above process will supply mixtures of bifunctional and monofunctional products, and, the peroxidic oxygen content being the same, the latter will be present in a quantity which will decrease as the molecular weight of the starting material increases.

Since the bifunctional telomers can be employed in the field of macromolecular chemistry as starting materials for the synthesis of high polymers by polycondensation, it is important, as is well known to those skilled in macromolecular chemistry, to reduce to a minimum the presence of molecules having non-functional (i.e., neutral) terminals. As a practical matter, the functional products obtained by reducing the high molecular weight polymeric products prepared in accordance with this invention have a functionality degree very close to 2.

Another field of application of the products of this invention is the use as lubricating oils or greases (obtained by suitable thickening agents) of the inert, neutral fluids obtained by (1) tetrafluoroethylene photooxidation in accordance with this invention followed by (2) total elimination of the peroxide bridges and conversion of the acid terminal groups, which may be present, into neutral perfluoroalkoxy terminal groups, according to the teaching of Canadian Pat. No. 810,750 issued on Apr. 15, 1969. The technological properties of said fluids depend on the molecular weight. Thus, upon subjecting crude products wherein the sum of the $-CF_2-O-$ and $-CF_2-CF_2-O-$ repeating units present in the molecule is higher than 200 to a fluorination process, inert fluids are obtained which have a high viscosity, tending to assume the consistency of a fat, and are consequently particularly useful in the lubricating field. For many uses in this field, it is possible to use the neutral polymeric products directly as obtained from the fluorination reaction, as indicated above. On the other hand, if necessary, it is possible to use distillation fractions of the above neutral polymers having the required average characteristics. These new neutral polymeric products have an extremely low volatility, so that they are particularly suitable not only as lubricants, but also as heat exchange materials.

The molecular weights of the new polymeric polyether products cannot be determined with precision by the convenitonal measurements of average number molecular weight. The determination of the terminal group content by the NMR method cannot be employed since the sensitivity of that method permits molecular weight determinations on macromolecules having a miximum molecular weight of about 15,000, above which molecular weight the concentration of the terminal groups is too low to be detectable. The other conventional method, i.e. the use of the VPO technique (Vapor Pressure Osmometry), does not give satisfactory practical results inasmuch as the instrument used (Perkin-Elmer, model 115) makes it possible to effect reasonably accurate measurements up to the maximum molecular weight limit of 15,000 to 20,000.

A relative indication of the molecular weight of polyether peroxides having a substantially similar chemical composition can be drawn from the measurement of their respective absolute viscosities. On the other hand, it is also possible to obtain sufficiently accurate approximate molecular weight measurements for products having relatively high molecular weights by using intrinsic viscosity measurements [$\eta$]. The values K and a appearing in the equation of Mark-Houwink ([$\eta$]=KM$^a$) establish a relationship between the value of the intrinsic viscosity and the average viscosimetric molecular weight, M. It is therefore possible to calculate the constants K and a by measuring the values of [$\eta$] on low molecular weight samples whose average number molecular weights were known through VPO and NMR analysis. By extrapolation using these values of K and a, it is then also possible to calculate the average viscosimetric molecular weights for the high molecular weight products. The intrinsic viscosity measurements were effected at 30° C. in a solution of FC-75, a product of the 3M Company that is a fully fluorinated solvent consisting of a mixture of products containing eight carbon atoms, e.g., perfluoropropylpyran and perfluorobutylfuran.

While, as indicated above, the terminal group concentration in the high molecular weight copolyethers of the present invention is too low to be detectable or determined directly by readily available analytical procedures, and while not wishing to be bound to any theory of the invention, we believe that the nature of the terminal groups would be the same as those on analogous lower molecular weight copolyethers. Thus, it is to be expected that the product obtained directly from the irradiation of tetrafluoroethylene in accordance with the present invention would have the same terminal groups as the lower molecular weight products produced by the closely related process of application Ser. No. 702,533, now U.S. Pat. No. 3,715,378, namely, terminal groups selected from —$CF_3$, —COF and —$CF_2COF$. Moreover, as disclosed in that application, these terminal groups can be routinely converted to corresponding derivatives as by hydrolysis, esterification, salt formation, amidation, dehydration of the amide to nitrile, and decarboxylation.

In addition, those products obtained directly by photochemical reaction of oxygen with tetrafluoroethylene can be otherwise modified by subsequent chemical reactions. The foregoing transformations include those carried out by use of processes described in U.S. Pat. No. 3,442,942, issued May 6, 1969 and in applications Ser. Nos. 31,852 (filed May 1, 1970) now U.S. Pat. No. 3,699,145) and 43,643 (filed May 1, 1970) now U.S. Pat. No. 3,704,214, the contents of which are incorporated herein by reference, those processes having been described therin with respect to perfluorinated polyethers consisting essentially of a succession of $C_3F_6$ units bound to each other by either ether or peroxidic bridges. The chemical transformations may involve either a variation of the peroxidic group content in the chains or a variation of the nature of the terminal groups and, possibly, of one or more fluorinated units immediately preceding such terminal groups.

The peroxidic group content of the copolyether can, for example, be reduced and eventually eliminated by thermal treatment at a temperature between 100° and 250° C., or by irradiation with U. V. light of the copolyethers, either in the pure state or in solution in inert solvents. As solvents there are employed halogenated solvents such as perfluorocyclobutane, perfluorodimethylcyclobutane, perfluorobenzene, perfluorocyclohexane, perfluoropropylpyran, 1,1,2-trichloro-1,2,2- trifluoroethane 1,2-dichlorotetrafluoroethane, 1,1,1-trifluorotrichloroethane, difluorodichloromethane, trifluorochloromethane, trichlorofluoromethane, carbon tetrachloride, chloroform, methylene chloride, etc.

Other transformations relate essentially to the terminal groups, e.g., the terminal group —$O.CF_2.CF_2.O.COF$ [or in general the terminal group —$O.(CF_2.CF_2.O)_m.(CF_2O)_n.COF$]. By simple thermal treatment (at 200°–300° C.) these groups are transformed into the terminal group —$O.CF_2.COF$ with the formation of $CF_2O$. Analogous transformations of terminal groups can be obtained at temperatures lower than 100° C. by the action of bases.

As already indicated, from the acid terminal group —$O.CF_2.COF$, by reactions of known type, a great number of derivatives can be obtained. For example, water reacts with this group, thus giving the corresponding fluorinated copolyethers having as the terminal group a carboxylic acid group. This, in turn, can be transformed into a salt, ester, amide, or nitrile by known reactions.

A typical reaction is the decarboxylation of salts (e.g., alkaline salts) of the preceding acid polyethers, as by heating to temperatures generally higher than 150° C., in the presence of hydrogen donor substances (e.g., water, alcohols, glycols, alkaline hydroxides, etc.). There results the formation of neutral terminal groups of the type —$O.CF_2H$.

Moreover, U.S. Pat. No. 3,665,041 discloses a process for reacting, inter alia, the lower molecular weight copolyethers of U.S. application Ser. No. 702,533, now U.S. Pat. No. 3,715,378 (the contents of which have already been incorporated herein by reference) with gaseous fluorine, either pure or diluted with an inert gas up to a fluorine content of 10 percent by volume, under pressures between about 0.2 and 10 atm. and at temperatures between about 100°and 350° C., whereby to eliminate any peroxidic oxygen originally present in the copolyether and to convert the starting terminal groups ($CF_3O$—, —$CF_2COF$, —COF) to —$CF_3$ and —$C_2F_5$ terminals. A typical such reaction is illustrated in Example 6 of that patent. It is understood that this reaction, too, would give identical results with the analogous higher molecular weight copolyethers of the present invention.

In addition, and as briefly discussed hereinabove, it is understood that the reductive cleavage reaction described in U.S. patent application Ser. No. 834,486, filed June 18, 1969, now U.S. Pat. No. 3,847,978 the contents of which are hereby incorporated herein by reference, would also operate analogously on the irradiation reaction products of the present invention and their herein described derivatives.

More particularly, the process described in the last mentioned application comprises the cleavage of a perfluorinated linear polyether, containing peroxidic oxygen bridges, or a mixture thereof, having the general formula:

$$X—O—(CF_2O)_q—(C_2F_4O)_r—(O)_s—Y$$

wherein the ratio q/r can vary, for instance, within the range of from about 0.2 to 5, the ratio s/(q+r) can be between about 0.1 and 0.5, still having, however, the difference r−s greater than O, X and Y are the $CF_3—$, $—COF$ or $—CF_2—COF$ groups, or the derivatives thereof obtained by hydrolysis, salt formation, or esterification of the acid fluoride groups and by addition of water or alcohols to the ketone groups, the different oxyperfluoroalkylene units are randomly distributed along the chain, and —(O)— is an oxygen atom distributed at random along the chain and linked in the peroxidic form to the different oxyperfluoroalkylene units. The cleavage is carried out by reacting the above defined polyether or a mixture of such polyethers with a reducing agent at a temperature of from about −30° C. to 250° C., preferably from about 20° C. to 100° C., under pressures between about 1 and 200 atm., preferably between 1 and 100 atm., optionally in the presence of a solvent or of a dispersing agent, the reducing agent being selected from the group consisting of molecular hydrogen, nascent hydrogen, primary and secondary alcohols such as methanol, ethanol, isopropanol, etc., either alone or in the presence of aluminum alcoholates, such as aluminum isopropylate or the like, simple hydrides, e.g., LiH, KH and $AlH_3$, sulfur dioxide, hydrogen sulfide and alkali metal salts thereof, hydrazine, hydroxylamine, phosphorous acid, hypophosphorous acid and the alkali metal salts of phosphorous acid and hypophosphorous acid, stannous chloride and hydroiodic acid.

Optionally, the reduction products may be subjected to further treatments of hydrolysis, salt formation, esterification or amidation of the acid groups, dehydration of amides to nitriles, and addition of water or alcohols or amines to the $—CF_2—CO—CF_3$ ketone groups, to obtain the desired terminal groups.

The reduction process can be conducted both in the absence as well as in the presence of solvent or dispersing liquid media which are inert with respect to the reactants used and to the terminal groups that are formed.

The action of the above defined reducing agents on peroxidic copolyethers causes the cleavage of the —O—O— bonds present in the chains in amounts up to 10 parts by weight, preferably from 0.01 to 10 parts by weight, per 100 parts of the copolyethers, according to reactions that are described in detail in application Ser. No. 834,486, now U.S. Pat. 3,847,978, and results in shorter chain having $—CF_2COF$ terminals, their acid equivalent, $—CF_2COOH$, or, more generally, the derivatives of these groups obtained by hydrolysis, esterification, hydration and salt formation with various reactants or solvent present in the reaction medium or used in the course of the processing of the products.

The average molecular weight of the perfluorinated polyethers with reactive functions at both ends thus obtained depends essentially on the concentration of peroxidic groups in the starting polyether. More precisely, the greater this concentration, the lower the molecular weight of the difunctional polyethers. Also, the average molecular weight of the bifunctional polyethers is reduced when oxydifluoromethylene $—CF_2—O—$ units adjacent to peroxidic bridges are present in great numbers in the starting product.

Considering the fact that the distribution of the peroxidic bridges and of the ether bridges in the molecules of the starting materials is of a substantially random nature, it follows that the break up of said peroxidic bridges produces a mixture of bifunctional polyethers having different chain lengths.

All of the foregoing derivatives of the reaction products of the present invention, as well as other obvious variations thereof, are considerd to be within the scope of the present invention. The following examples are presented to further illustrate the present invention, without thereby limiting the scope thereof.

EXAMPLE 1

Into a cylindrical glass reactor, having a diameter of about 80 mm and a volume of about 600 cc, provided with an internal coaxial quartz sheath having a 20 mm diameter, and provided, moreover, with a dipping tube for feeding gases and a reflux condenser kept at a temperature of −80° C., were fed 600 cc of $CF_2Cl_2$.

A gaseous mixture consisting of 74 liters/hour of oxygen and 37 liters/hour of tetrafluoroethylene was bubbled into the reactor through the dipping tube. The tetrafluoroethylene was selected with particular attention to its purity; when subjected to gas chromatographic analysis, its impurities content did not exceed 20 p.p.m.

The temperature of the reacting liquid phase was kept at −50° C. for the entire run with the aid of an external cooling bath. After having introduced into the quartz sheath a U.V. lamp of the Hanau Q 81 type (emitting 6.12 W of U.V. rays having a wave length ranging from 2,000 to 3,300 Å), it was activated, and the irradiation and feeding of both reacting gases was continued for two hours.

The gases flowing out of the reactor were removed after being washed with a 30% by weight KOH solution. After two hours of irradiation the lamp was switched off and the solvent was removed from the reactor by evaporation at room temperature. 119 g of an oily, highly viscous and glass-like polymeric residue were thus obtained.

When subjected to iodometric analysis, this residue showed an active oxygen content of 4.15 wt.%. When subjected to N.M.R. analysis, it appeared to consist of polyetherpolyperoxide chains wherein the ratio of $—CF_2—CF_2O—$ to $—CF_2O—$ repeating units was 4.51.

The viscosity of the product was so high that it was not possible to determine the value thereof using a normal Ostwald-Fenske viscosimeter. The molecular weight could not be determined by the NMR method inasmuch as the spectrograms did not show the signals corresponding to the end groups of the chain. Neither did attempts to determine the molecular weight by VPO provide a molecular weight determination, since the difference in steam tension between a dilute solution of the polymer product and the solvent were practically nil.

Intrinsic viscosity determinations in an FC-75 solution at +30° C. gave a value of 0.347 dl/g. this value corresponds to a molecular weight of 70,000, the constants of the Mark-Houwink formula having been determined to have values of: $K=0.806\times 10^{-4}$ and $a=0.75$.

The average value of the sum of all the pefluoroalkyleneoxy units was consequently about 630. This example demonstrates that, when using such operating conditions that the ratio F/V E is $4.49\times 10^{-4}$, products with a high average molecular weight are obtained.

EXAMPLES 2 AND 3 AND COMPARATIVE EXAMPLE 4

The preparation described in Example 1 was repeated in this set of runs, with the only difference being that the quantities of tetrafluoroethylene fed into the reactor were changed from run to run (the ratio of tetrafluoroethylene to oxygen remaining unchanged).

Table 1 shows the actual operating conditions and the quantities and characteristics of the macromolecular products obtained in each run.

As can be seen from the data contained in the table, the runs where the ratio F/V E was kept above $3 \times 10^{-4}$ supplied high molecular weight products (Examples 2 and 3). On the contrary, in Comparative Example 4, the value of the above ratio was kept under 3 and, as a consequence, the average value of the sum of the repeating units was lower than 200.

300 g of the above described product of Example 3, obtained in a set of 4 runs repeated under the same conditions, were fed into a glass flask provided with a mechanical stirrer and a reflux condenser and were heated gradually in an oil bath until, after 8 hours, a final temperature of 250° C. was reached. Gaseous products consisting predominantly of $COF_2$ began to be developed at about 150° The increase in temperature had to be very slow at the beginning in order to avoid triggering any violent reactions.

When the heating stage was completed, 175 g of a product were obtained which, upon iodometric analysis, appeared not to contain any peroxidic oxygen.

This product was subjected to fluorination in a glass flask provided with a stirrer, a reflux condenser and a dipping tube for feeding fluorine. Said fluorination was carried out by heating at 200° C. for 15 hours while feeding 20 l/hour of pure fluorine.

At the end of the foregoing fluorination step, 160 g of a highly viscous, stable and neutral fluid were obtained which, upon NMR analysis, did not show any substantial quantity of signals corresponding to terminal groups. The ratio of —$CF_2CF_2O$— and —$CF_2O$— repeating units, determined by the same method, was 1.5.

Molecular weight measurements made by intrinsic viscosity determinations showed a molecular weight of 22,000. Consequently, the average sum of repeating units present in the molecule corresponded to about 230.

EXAMPLES 5 and 6 AND COMPARATIVE EXAMPLE 7

This set of runs was carried out in accordance with Example 1, but using a set of three cylindrical glass reactors having volumes of 300, 330 and 900 cc, respectively, and constructed so as to contain a coaxial quartz sheath having a 25 mm diameter. Each reactor was provided with a dipping tube for feeding gases and a reflux condenser kept at a temperature of −80° C.

The single runs were carried out by filling the selected reactor with $CF_2Cl_2$ and then bubbling into it a gaseous mixture of $C_2F_4$ and $O_2$ in a ratio of 1:2.

The U.V. lamp employed was of the Hanau TQ 150 type, emitting 13.2 watts of rays having a wave length ranging from 2,000 to 3,300 Å. The time of irradiation was two hours each of the runs.

The remaining operating conditions are shown in Table 1, together with the characteristics of the macromolecular products obtained.

Also from these tests it can be seen that the use of F/V E ratios in excess of $3 \times 10^{-4}$ (Examples 5 and 6) results in high molecular weights while, on the contrary, values of this ratio below $3 \times 10^{-4}$ (employed in Comparative Example 7) result in low molecular weights (sum of repeating units lower than 200).

When comparing Example 6 with Example 3, it can be noticed, moreover, that very close values of the ratio F/V E, obtained, however, by a different combination of operating conditions, do not necessarily result in equal molecula weight values.

COMPARATIVE EXAMPLE 8(NOT WITHIN THE SCOPE OF THE INVENTION)

The preparation described in Example 5 was repeated, with the only difference being that the solvent employed was methylene chloride instead of $CF_2Cl_2$.

All the remaining operating conditions were identical to those of Example 5, Table 1 shows the characteristics of the product obtained.

This comparative example shows that the use of a solvent not included in the group of critical solvents results in low molecular weight macromolecular products even though the ratio F/V E is higher than $3 \times 10^{-4}$.

EXAMPLE 9 AND COMPARATIVE EXAMPLE 10

These two preparations were effected using the same 300 cc reactor as employed in Example 5, this reactor being equipped with a U.V. generator of the Hanau Q 81 type for carrying out Example 9 and a U.V. generator of the Hanau TQ 150 type for carrying out ComparativeExample 10. The solvent employed was 1,2-dichlorohexafluoropropane, and $C_2F_4$ and oxygen were bubbled into the solvent in a ratio of 1:2, while irradiating for one and one-half hours.

The remaining operating conditions, as well as the quantities and characteristics of the products obtained, are set forth in Table 1. An examination of the results shows that also when employing 1,2-dichlorohexafluoropropane it is possible to obtain high molecular weight perfluorinated copolyethers when operating in such a way that the ratio FV E is higher than $3 \times 10^{-4}$.

Comparative Example 10 shows that values of the ratio F/V E lower than $3 \times 10^{-4}$ lead to low molecular weight products with this solvent, too.

EXAMPLE 11

This preparation was made by using a cylindrical reactor similar to that used in the preceding examples (but having a volume of 190 cc) equipped with a U.V. light generator of the Hanau TQ 150 type. The solvent employed was perfluorodimethylcyclobutane, and $C_2F_4$ and oxygen were bubbled into the solvent in a ratio of 1:2 while irradiating for one hour.

The remaining operating conditions, as well as the quantity and characteristics of the product obtained, are set forth in Table 1. It should also be observed that, during this run, there occurred a partial homopolymerization of the tetrafluoroethylene, so that it was necessary to separate, by extraction with a solvent, the high molecular weight perfluorinated copolyether from polytetrafluoroethylene. (The latter was insoluble in the normal fluorinated solvents, e.g. in the perfluorodimethylcyclobutane reaction solvent itself.) An examination of the results shows that also when employing perfluorodimethylcyclobutane as the solvent high molecular weight perfluorinated copolyethers are obtained if the reaction conditions are chosen in such a way that the ratio F/V E is higher than $3 \times 10^{-4}$.

EXAMPLES 12 AND 13

These preparations were made using cyclindrical reactors similar to those of the foregoing examples but having volumes of 230 and 300 cc, respectively.

The reactors were equipped with U.V. generators of the Hanau Q 81 type in both cases. The solvent employed was $CF_2Cl_2$, and $C_2F_4$ and oxygen were bubbled into the solvent in a ratio of 1:2 while irradiating for 2 hours. The remaining operating conditions, as well as the quantities and characteristics of the products obtained, are set forth in Table 1. Also in these two runs there were formed, together with the oily, high molecular weight perfluorinated copolyether, different quantities of polytetrafluoroethylene due to partial homopolymerization of the tetrafluoroethylene, and it therefore became necessary to effect a separation by extraction with a solvent. These examples show in greater detail that the operating conditions may be widely modified and high molecular weight products will still be obtained, provided that the ratio F/V E is kept in excess of $3 \times 10^{-4}$.

Having thus described the invention, what we desire to secure by Letters Patent and hereby claim is:

1. A high molecular weight perfluorinated polymeric copolyether, the macromolecules of which have a chain structure consisting essentially of $-CF_2-CF_2-O-$ and $-CF_2-O-$ repeating units, said perfluorinated polymeric copolyether having a molecular weight of from 22,000 to about 75,000, said repeating units being randomly distributed along the chain and linked one to another either directly or through an oxygen atom in which latter case a peroxy group is present along the chain, the ratio of the total $-CF_2-CF_2-O$ units to the total $-CF_2-O-$ units being between about 0.2 and 25, the peroxidic oxygen content being up to 10 parts by weight per 100 parts of the copolyether, and the average sum of all the repeating units present along the chain being from 220 to 624.

2. The copolyether of claim 1, wherein the ratio of the total $-CF_2-CF_2-O-$ units to the total $-CF_2-O-$ repeating units is between about 1 and 20, the peroxidic oxygen content is below 6 parts by weight per 100 parts of the copolyether and the intrinsic viscosity at 30° C. is higher than 0.14 dl/g.

3. A heat treated and fluorine treated copolyether according to claim 1, wherein the peroxidic oxygen content is zero.

TABLE 1

| | EXAMPLE NO. | | | | | |
|---|---|---|---|---|---|---|
| | 2 | 3 | 4 (Comp.) | 5 | 6 | 7 (Comp.) |
| REACTION CONDITIONS | | | | | | |
| Temperature, °C. | −50° | −50° | −50° | −40° | −40° | −40° |
| $C_2F_4$ feeding, mols/hour | 1.35 | 1.11 | 0.67 | 1.35 | 1.35 | 1.35 |
| Solvent | $CF_2Cl_2$ | $CF_2Cl_2$ | $CF_2Cl_2$ | $CF_2Cl_2$ | $CF_2Cl_2$ | $CF_2Cl_2$ |
| Reactor volume, cc | 600 | 600 | 600 | 300 | 330 | 900 |
| U.V. rays, watts | 6.12 | 6.12 | 6.12 | 13.2 | 13.2 | 13.2 |
| $\frac{F}{VE}$ | $3.67 \times 10^{-4}$ | $3.02 \times 10^{-4}$ | $1.82 \times 10^{-4}$ | $3.41 \times 10^{-4}$ | $3.09 \times 10^{-4}$ | $1.14 \times 10^{-4}$ |
| PRODUCT OBTAINED, GRAMS | 102.9 | 88.1 | 55.5 | 91.6 | 87.0 | 97.6 |
| CHARACTERISTICS OF PRODUCT | | | | | | |
| Active oxygen, % by weight | 3.84 | 3.43 | 2.76 | 2.81 | 2.99 | 3.22 |
| $-CF_2CF_2O-/-CF_2O-$ ratio | 3.64 | 2.27 | 1.79 | 2.65 | 2.30 | 1.92 |
| Average molecular weight | 57,500 | 38,000 | 12,500 | 30,000 | 22,000 | 15,000 |
| Sum of oxyperfluoroalkylene units | 526 | 364 | 160 | 285 | 220 | 147 |

| | EXAMPLE NO. | | | | | |
|---|---|---|---|---|---|---|
| | 8 (Comp.) | 9 | 10 (Comp.) | 11 | 12 | 13 |
| REACTION CONDITIONS | | | | | | |
| Temperature, °C. | −40° | −60° to −50° | −60° to −51° | −35° | −40° | −65° to −50° |
| $C_2F_4$ feeding, mols/hour | 1.35 | 0.82 | 1.07 | 0.90 | 0.90 | 1.35 |
| Solvent | $CH_2Cl_2$ | $CF_3CFClCF_2Cl$ | $CF_3CFClCF_2Cl$ | P.F.D.B.* | $CF_2Cl_2$ | $CF_2Cl_2$ |
| Reactor volume, cc | 300 | 300 | 300 | 190 | 230 | 300 |
| U.V. rays, watts | 13.2 | 6.12 | 13.2 | 13.2 | 6.12 | 6.12 |
| $\frac{F}{VE}$ | $3.41 \times 10^{-4}$ | $4.46 \times 10^{-4}$ | $2.70 \times 10^{-4}$ | $3.58 \times 10^{-4}$ | $6.30 \times 10^{-4}$ | $7.35 \times 10^{-4}$ |
| PRODUCT OBTAINED, GRAMS | 0.9 | 36.9 | 47.5 | 17.0** | 38.0** | 50.2** |
| CHARACTERISTICS OF PRODUCT | | | | | | |
| Active oxygen, % by weight | 2.18 | 3.40 | 2.30 | 0.74 | 3.93 | 5.51 |
| $-CF_2CF_2O-/-CF_2O-$ ratio | 0.79 | 2.50 | 2.17 | 1.50 | 4.00 | 18.80 |
| Average molecular weight | 530 | 36,000 | 10,000 | 42,000 | 55,800 | 75,000 |
| Sum of oxyperfluoroalkylene units | 5.8 | 342 | 98 | 432 | 506 | 624 |

*P.F.D.B. = Perfluorodimethylcyclobutane
**The weight refers only to the oily product after separation from polytetrafluoroethylene Variations can, of course, be made without departing from the spirit and scope of the invention.